A. v. BRIESEN.
SCREW SECURED ARTICLE AND PROCESS OF PRODUCING SAME.
APPLICATION FILED DEC. 30, 1910.
992,331. Patented May 16, 1911.
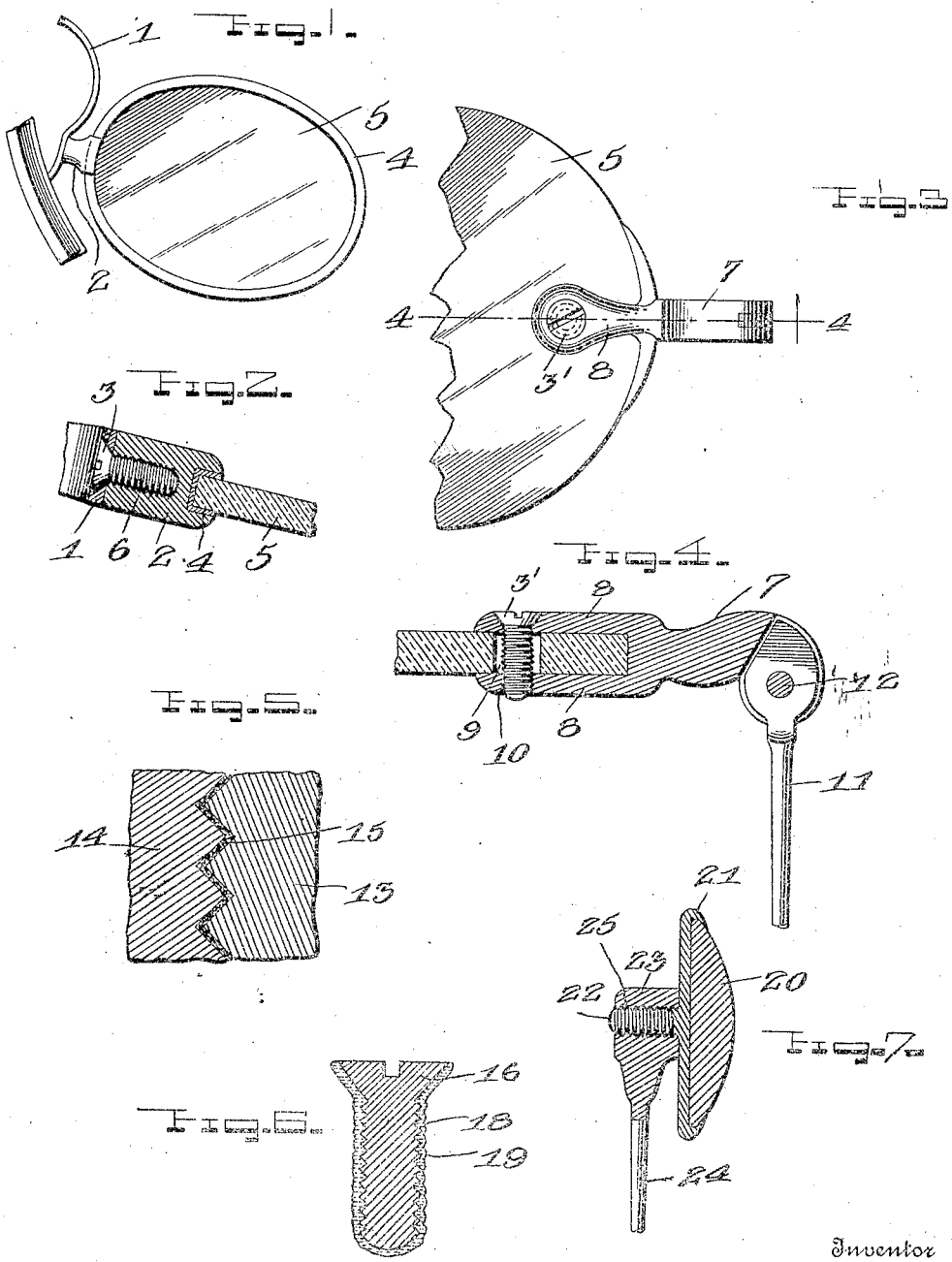

UNITED STATES PATENT OFFICE.

ARTHUR v. BRIESEN, OF NEW YORK, N. Y.

SCREW-SECURED ARTICLE AND PROCESS OF PRODUCING SAME.

992,331.      Specification of Letters Patent.      Patented May 16, 1911.

Application filed December 30, 1910. Serial No. 600,053.

*To all whom it may concern:*

Be it known that I, ARTHUR V. BRIESEN, a citizen of the United States, residing at New York, in the county of New York and State of New York, have invented certain new and useful Improvements in Screw-Secured Articles and Processes of Producing the Same, of which the following is a specification.

This invention relates to screw-secured articles and processes of producing same; and it comprises an article having a threaded socket and a metal screw secured therein through an intervening doubly corrugated thin annular layer of glass; and it also comprises a process of producing such articles wherein a screw is filmed with a waterglass solution, is inserted in a properly threaded socket and the assemblage is allowed to dry; all as more fully hereinafter set forth and as claimed.

In many articles made of or employing the noble metals, gold, silver and platinum, it is necessary to employ small fine-threaded screws of these metals in attaching part to part; and the unions secured are not always as firm and permanent as is desirable. The smaller a screw the finer and thinner of course is the layer of metal constituting the thread and the less its strength and stiffness. The noble metals are relatively soft and weak, and they are not much improved in this respect by alloying with copper, the usual metal used for alloying. No such stiff, strong, shape-retaining fine thread can be produced on any small screw of gold, silver, platinum or copper or their mutual alloys as can be produced on steel, for example. Even with relatively strong brasses and bronzes fine screw threads are easily marred and defaced. Small screw-threaded parts and elements of these relatively soft metals are, however, a necessity for many purposes, as in the mountings of eyeglass and spectacle lenses, in demountable gem settings, in composite lockets, and many other jewelry articles. Taking a pair of eyeglasses for instance, several screw-threaded unions may be necessary, as in the two lens-clamps, and, sometimes, also in the nose-piece; in a pair of spectacles, ordinarily there are threaded unions at the hinges of the bows, etc. All these screws must be very small, carrying a fine thread and they must be of a noble metal, very little hardened or stiffened by alloying with copper or the like. The result is that the working loose of these small screw threaded unions is a constant source of annoyance and loss. No matter how accurately the threads may fit at first, in the course of time they become defaced, dented and misshapen with the result of a loose union. The strains upon lens-mountings and jewelry articles incident to wear and use tend to make the comparatively soft metal in the thin layer of the screw thread flow and yield and lose its sharpness of outline so that the screw union is no longer firm. And one or two removals and replacements by the screw driver are apt to have the same effect.

In the present invention I have devised a way of obviating the noted difficulties and permitting the use of screws of the relatively soft noble metals while still securing a firm and permanent union no matter what the defacement of the screw incident to wear or use of removal may be. For this purpose, before insetting the screw in its socket, I dip it in a solution of waterglass. Waterglass is silicate of potash or silicate of soda, or a mixture of both, and comes into commerce in the form of a strong syrupy solution in water. This water solution exposed to the air and dried down in thin films is not very permanent since it takes up carbon dioxid which is apt to make it effloresce. In other situations exposed to air, as when used to impregnate fibrous material, it is also apt to effloresce. It dries down however in the first instance to a hard, glassy layer, not much different from ordinary glass. The dried waterglass is not hygroscopic and is not soluble to any extent in water at ordinary temperatures. It is not softened or altered by ordinary changes of temperature. By covering a screw thread with a solution of waterglass, which may be strong or dilute as preferred, and then insetting the screw, the waterglass dries down between the two threads to form a glassy, hard doubly corrugated annular bond layer therebetween spacing and uniting with a firm union the two coöperating parts; and as the air is not able to gain access to or affect this layer, it retains its glassy nature for a long period of time, in fact indefinitely. The union it forms between the threads is permanent for all purposes; it is strong, stiff, and unyielding. There is a layer of glass between the two metal surfaces. Obviously, with this layer present the actual shape of either screw thread and, consequently, its fit, becomes a matter of indifference as long as the one thread will enter the other. At the same time this union is not so strong but that it is readily broken by the screw driver, permitting the removal of the screw. The dried layer of waterglass, like any other glass though comparatively strong, readily shatters and breaks under the exertion of a moderate force. At any time the screw may be removed, cleaned, wetted with waterglass solution and replaced to secure the same union as originally existed. As will be seen, with this uniting and linking layer of waterglass between the screw threads, the screw threads in the present invention may even be so defaced that they fail to engage each other accurately and become merely a means of securing registry. In other words, the present process may be applied to existing articles which have worked loose to produce a firm and permanent union.

In the accompanying illustration I have shown, more or less diagrammatically, certain embodiments of the described invention.

Figure 1 is a fragmentary view of an eyeglass showing screw connected elements; Fig. 2 is a sectional view on an enlarged scale showing the screw connected elements with the bonding layer of glass therebetween; Fig. 3 is a fragmentary plan view of the screw connection in another form of eyeglass or spectacle; Fig. 4 is a sectional fragmentary view on line 4—4 with one element in elevation of the showing in Fig. 3; Fig. 5 is a detail view on a greatly enlarged scale showing two threaded metal elements with an intervening corrugated layer of hardened glass therebetween and uniting the same; Fig. 6 is a detail view of a screw wetted with waterglass solution and ready for insetting; and Fig. 7 is a sectional view of a stick pin mounting.

In the showing of Fig. 1, element 1 is the usual nose piece united to lug 2 by a screw 3, said lug carrying as usual, rim 4 of lens 5. In Fig. 2 the elements shown are the same but the showing is on an enlarged scale and in section, permitting the illustration of the doubly corrugated annular layer of hardened glass 6 uniting the two threaded elements.

In Figs. 3 and 4 the lens is carried by mounting 7 provided with two straps 8 through which passes the screw (3′). When the screw is placed in position the two straps are drawn together holding the edge of the lens firmly therebetween. The screw passes through orifice 9 in the lens, this orifice being usually, as shown, of materially larger diameter than the metal screw. This prevents breaking of the lens by expansion of the screw through heat changes. Layer 10 of hardened glass unites the thread of the screw with the thread of the lower strap.

Element 11 is the usual bow or ear piece pivotally connected at 12 to the mounting.

The view in Fig. 5 shows on an enlarged scale two threaded metal elements 13 and 14 connected by the intervening bonding doubly corrugated hardened glass annulus 15; and it may be taken as a sectional view of the threaded connection in Fig. 4 or in Fig. 2.

In Fig. 6 is shown a section of a screw 16 having thread 18 covered with a thin wetting layer 19 of waterglass solution.

In Fig. 7 is shown in section a jewel or stone 20 carried by holding member 21, having a threaded extension 22 secured in the head 23 of stick pin 24. Layer 25 of hardened glass unites the threads of the two threaded members.

In the showing of the drawings it will be seen that the article of the present invention presents opposing and registering screw threads spaced and united by a spirally corrugated glass body interposed between and combined with the threaded screw on the one side and the threaded plate or the like on the other and in cohering union with both.

If desired, the waterglass employed may be colored by any alkali-withstanding dye stuff, but this is not ordinarily necessary or desirable since where metal and metal are united the uniting layer of dry waterglass is invisible. Fillers, such as whiting and the like, may be employed in conjunction with the waterglass but their use is not desirable for the reason that they interfere wherever more or less well fitting screw threads are to be united. With such threads the space between is limited and it is not desirable to have granular bodies present. Small amounts of soluble fluorids, borates, chromates and the like, may be added to the waterglass to thin its consistency; but they are not necessary, though sometimes desirable.

I regard my invention as particularly applicable to the union of small metal screws with threaded metal holding elements. The waterglass solution may be applied to either the screw or the socket, but it is ordinarily more convenient to apply it to the former.

What I claim is:—

1. In an article of manufacture, the combination of a screw and its threaded socket with an intervening spirally corrugated continuous glass body interposed therebetween and in cohering union with said screw and said socket.

2. In an article of manufacture, the combination of a screw and its threaded socket with an intervening spirally corrugated continuous body of hardened waterglass interposed therebetween and in cohering union with said screw and said socket.

3. In an article of manufacture, the combination of a metal screw comprising noble metal and a threaded socket with an intervening spirally corrugated continuous glass body interposed therebetween and in cohering union with said screw and said socket.

4. In an article of manufacture, the combination of a metal screw comprising noble metal and a threaded socket with an intervening spirally corrugated continuous body of hardened waterglass interposed therebetween and in cohering union with said screw and said socket.

5. The process of uniting threaded elements which comprises coating the thread of one such element with a solution of waterglass, assembling the coated element with a coöperating threaded element and allowing the assembled elements to dry.

6. The process of uniting a threaded element with a threaded socket which comprises coating the thread of the former with a waterglass solution, assembling the coated threaded element with said threaded socket and allowing the assembled elements to dry.

In testimony whereof, I affix my signature in the presence of witnesses.

ARTHUR v. BRIESEN.

Witnesses:
F. F. KIRKPATRICK,
GEO. T. HOGG.